(No Model.)
M. Y. CAMPBELL.
COUPLING FOR HOOPS, &c.
No. 476,001. Patented May 31, 1892.
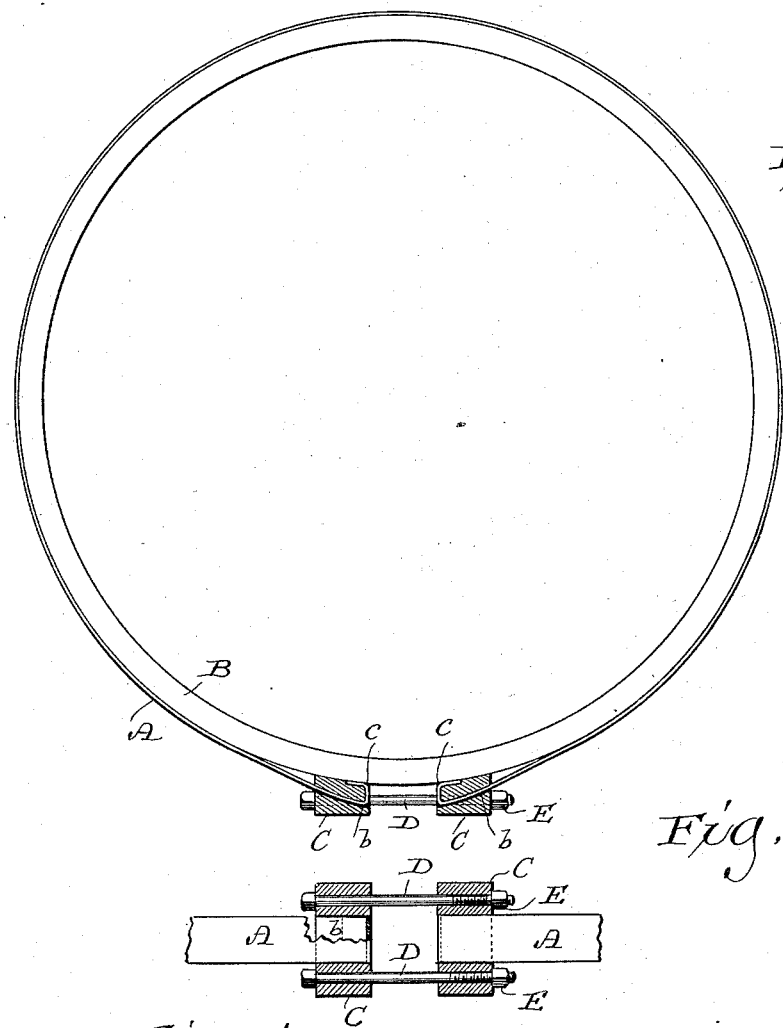
Fig. 1.
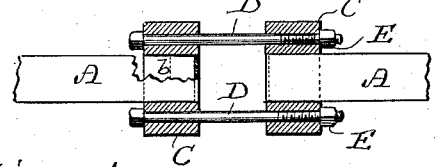
Fig. 2.
Fig. 4.
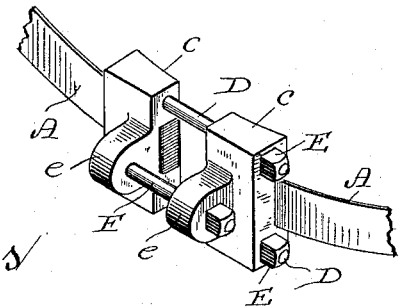
Fig. 3.
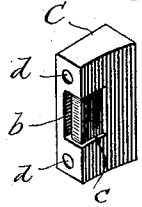
Witnesses
Geo. W. Young.
N. E. Oliphant.
Inventor
Malcolm Y. Campbell,
By H. G. Underwood
Attorney

UNITED STATES PATENT OFFICE.

MALCOLM Y. CAMPBELL, OF CHICAGO, ILLINOIS.

COUPLING FOR HOOPS, &c.

SPECIFICATION forming part of Letters Patent No. 476,001, dated May 31, 1892.

Application filed September 7, 1891. Serial No. 404,970. (No model.)

*To all whom it may concern:*

Be it known that I, MALCOLM Y. CAMPBELL, a citizen of the United States, and a resident of Chicago, in the county of Cook, and in the State of Illinois, have invented certain new and useful Improvements in Couplings for Hoops, &c.; and I do hereby declare that the following is a full, clear, and exact description thereof.

My invention has for its object to lock the ends of a hoop or band in coupling-sections without the aid of screws, bolts, plates, or rivets, as well as to adjustably unite said coupling-sections; and to this end said invention consists in certain peculiarities of construction and combination of parts to be hereinafter described with reference to the accompanying drawings and subsequently claimed.

In the drawings, Figure 1 represents a plan view, partly in section, illustrating a circular receptacle provided with a hoop having the ends thereof united by a coupling in accordance with my invention; Fig. 2, a side elevation of a portion of the hoop with the coupling, partly in section; Fig. 3, a perspective view of one section of the coupling shown in the preceding figures, and Fig. 4 a similar view illustrating another form of coupling in connection with the hoop or band.

Referring by letter to the drawings, A represents a hoop for cask B, and the ends of this hoop are connected to the opposing sections C C of my improved coupling. Each coupling-section consists of a metallic block having its inner side of a contour corresponding to the circumference of the cask; but in case of a band employed on other than a cylindrical receptacle or object said inner sides of the coupling-sections would be shaped to conform to the contour of the opposing surface. In any event each of the blocks or coupling-sections C is provided with a longitudinal slot $b$ and recess $c$, the slot being preferably diagonal, while the recess is in the inner side of said coupling-section adjacent to its inner end and approximately parallel to said slot. The ends of the hoop or band are passed through the slots $b$ in the coupling-sections C and recurved to enter and fill the recess $c$, whereby a snug fit is had against the cask or other opposing surface and a firm lock secured without the employment of screws, bolts, plates, rivets, or other fastening devices. On each side of the slot therein each coupling-section C is provided with an opening $d$ for the passage of a bolt D, and the openings in one coupling-section oppose those of the other. The hoop or band being placed around the cask or other object, the bolts D are passed through the openings $d$ in the coupling-sections, and by means of nuts E on these bolts said coupling-sections are caused to approach each other whereby said hoop or band is drawn to the degree of tightness required and retained in position.

As shown in Figs. 1 to 3, inclusive, there are only two bolt-openings in each of the coupling-sections; but in case more bolts are necessary or desirable said coupling-sections may be provided with right-angle extensions $e$, having one or more openings therein for a corresponding number of bolts F, as shown in Fig. 4.

Having thus described my invention, what I claim as new, and desire to secure by Letters Patent, is—

1. The combination of a pair of slotted blocks recessed at the inner sides of their inner ends, a hoop or band having its ends passed through the block-slots and recurved into the adjacent recesses, whereby a snug fit is had against a cask or other opposing surface to secure a firm lock of the band ends independent of screws, bolts, plates, rivets, or other fastening devices, and suitable means for connecting said blocks, substantially as set forth.

2. The combination of a pair of diagonally-slotted blocks recessed at the inner sides of their inner ends parallel with the slots, a hoop or band having its ends passed through the block-slots, recurved into the adjacent recesses, and there retained independent of any fastening devices, and suitable means for connecting said blocks, substantially as set forth.

3. The combination of a pair of slotted blocks recessed at the inner sides of their inner ends, a hoop or band having its ends passed through the block-slots, recurved into the adjacent recesses, and there retained independent of any fastening devices, bolts engaging both blocks, and nuts adjustable on the bolts, substantially as set forth.

In testimony that I claim the foregoing I have hereunto set my hand, at Chicago, in the county of Cook and State of Illinois, in the presence of two witnesses.

MALCOLM Y. CAMPBELL.

Witnesses:
W. W. HECKEL,
E. R. DEMING.